US012259123B2

(12) United States Patent
Butler et al.

(10) Patent No.: US 12,259,123 B2
(45) Date of Patent: Mar. 25, 2025

(54) CANDLE

(71) Applicant: Reckitt & Colman (Overseas) Hygiene Home Limited, Slough (GB)

(72) Inventors: Martin Richard Butler, Kwun Tong (HK); Jin Wu, GuangDong (CN); Guoqiang Lai, GuangDong (CN); Bin Liao, GuangDong (CN); Fengyang Wang, GuangDong (CN)

(73) Assignee: Reckitt & Colman (Overseas) Hygiene Home Limited, Slough (GB)

(*) Notice: Subject to any disclaimer, the term of this patent is extended or adjusted under 35 U.S.C. 154(b) by 0 days.

(21) Appl. No.: 17/768,954

(22) PCT Filed: Nov. 5, 2020

(86) PCT No.: PCT/EP2020/081165
§ 371 (c)(1),
(2) Date: Apr. 14, 2022

(87) PCT Pub. No.: WO2021/089716
PCT Pub. Date: May 14, 2021

(65) Prior Publication Data
US 2024/0102645 A1 Mar. 28, 2024

(30) Foreign Application Priority Data
Nov. 5, 2019 (GB) ..................................... 1916051

(51) Int. Cl.
*F21V 35/00* (2006.01)
*F21V 23/04* (2006.01)
*F23D 3/16* (2006.01)

(52) U.S. Cl.
CPC .......... *F21V 35/00* (2013.01); *F21V 23/0442* (2013.01); *F23D 3/16* (2013.01)

(58) Field of Classification Search
CPC ......... F21V 35/00; F21V 23/0442; F23D 3/16
(Continued)

(56) References Cited

U.S. PATENT DOCUMENTS 7,121,686 B1 * 10/2006 Chu .................... F21V 23/0442 362/228
2005/0110417 A1 5/2005 Li
(Continued)

FOREIGN PATENT DOCUMENTS

CN 2263108 Y 9/1997
CN 109442335 A 3/2019
(Continued)

OTHER PUBLICATIONS

International Search Report and Written Opinion of the International Searching Authority for corresponding application PCT/EP2020/081165 dated Feb. 10, 2021.
(Continued)

*Primary Examiner* — Vivek K Shirsat
(74) *Attorney, Agent, or Firm* — Norris McLaughlin, PA

(57) ABSTRACT

The present invention relates to a candle which includes a base unit and a candle body which is mounted to the base unit. The candle body includes a wick and a fibre optic running therethrough. The base unit includes a light sensor configured to detect light from the wick, when lit. There is additionally provided a light source configured to operate in dependence on detection of light by the light sensor.

15 Claims, 4 Drawing Sheets

(58) Field of Classification Search
USPC .................. 431/126, 288–297; 362/161, 228
See application file for complete search history.

(56) References Cited

U.S. PATENT DOCUMENTS

| | | | | |
|---|---|---|---|---|
| 2006/0024627 | A1* | 2/2006 | Platts | F23D 3/16<br>431/14 |
| 2007/0003894 | A1 | 1/2007 | Yu | |
| 2007/0154857 | A1 | 7/2007 | Cho | |
| 2009/0170044 | A1 | 7/2009 | Kang | |

FOREIGN PATENT DOCUMENTS

| | | | |
|---|---|---|---|
| EP | 1336799 | A2 | 8/2003 |
| EP | 1803994 | A1 | 7/2007 |

OTHER PUBLICATIONS

English translation of CN Office Action for corresponding application CN 202080076712.5 dated Dec. 29, 2023.

* cited by examiner

CANDLE

This is an application filed under 35 USC 371 based on PCT/EP2020/081165 filed on 05.Nov.2020, which claimed priority to GB 1916051.4 filed 05.Nov.2019. The present application claims the full priority benefit of all prior applications and incorporates by reference their full disclosures as if set forth herein.

TECHNICAL FIELD OF THE INVENTION

The present invention relates to candles, and in particular to candles which include an additional light source for illuminating the candle.

BACKGROUND TO THE INVENTION

It is known to provide candles which include an additional light source for illuminating the body of the candle. Typically, the light source may be embedded within the body of the candle and include a switch for turning the light source on and off. More recently, candles have been provided which include a fibre optic or other means within the body of the candle for transmitting light from a lit wick to a light sensor associated with the light source.

However, by embedding the light source and associated electronic circuitry within the body of the candle there is an increased risk for these components to become damaged due to the proximity of the components to a flame and/or heated/melted wax when the candle is lit. Further, candles of this type are typically single use only given that the light source (and associated circuitry) is integral with the body of the candle.

It is therefore an aim of an embodiment or embodiments of the invention to overcome or at least partially mitigate one or more problems with the prior art.

SUMMARY OF THE INVENTION

According to an aspect of the invention there is provided a candle, comprising: a base unit and a candle body removably mounted to the base unit; wherein the candle body comprises a wick and a fibre optic running therethrough; and the base unit comprises: a light sensor configured in use to detect light emitted from the wick and transmitted via the fibre optic; and a light source configured to operate in dependence on detection of light by the light sensor.

Advantageously, the light sensor and light source are provided in a separate base unit mitigating the issues discussed herein relating to having such electronic components proximal to a flame, in use. Further, having the candle body separate from the base unit allows for the base unit to be reused with a replacement candle body, for example.

In embodiments, the candle body may comprise a recess in a portion thereof. The recess may be provided in a lower portion of the candle body. In some embodiments the recess may be configured to receive at least a portion of the base unit, in use. For example, in some embodiments the candle body may comprise a recess in a lower portion thereof configured to receive at least a portion of the base unit for removably mounting the candle body to the base unit, in use.

Advantageously, providing a recess within the candle body may allow for the candle body to be quickly and easily mounted to the base unit. Further, this configuration may allow for the candle body to be quickly and easily aligned with the base unit, e.g. to correctly align the fibre optic within the candle body with the light sensor within the base unit. This configuration may also increase stability of the candle body on the base unit—e.g. to prevent the candle body sliding off the base unit, if moved.

In some embodiments the recess within the candle body may comprise a substantially circular cross-section. Advantageously, the candle body may be mounted on the base unit at any rotational position. In such embodiments, the fibre optic within the candle body may be located substantially centrally within the candle body. In this way, the fibre optic may be positioned correctly with respect to the light sensor of the base unit irrespective of the rotational position of the candle body mounted on the base unit.

In other embodiments the recess within the candle body comprises a polygonal cross section. In such embodiments, the candle body may be mounted on the base unit at one or more discrete rotational positions. In embodiments, the recess within the candle body comprises a polygonal cross section configured such that the candle body is able to be mounted on the base unit at a single rotational position. Advantageously, this arrangement ensures that the fibre 30 optic is correctly positioned with respect to the light sensor of the base unit without requiring the fibre optic to be provided substantially centrally within the candle body.

The base unit may comprise at least a portion thereof which includes a circular or polygonal cross-section. The base unit may comprise at least a portion thereof configured to be received within the recess in the candle body, the portion comprising a cross-section corresponding to the cross-section of the recess.

In embodiments, the candle may be configured such that, in use, light from the light source is directed into the recess within the candle body. Advantageously, configuring the candle in this manner allows for light from the light source to better permeate the candle body giving a more even and noticeable illumination of the candle body when compared with arrangements where light is directed onto a flat outer surface of the candle body.

In embodiments, the base unit may comprise a raised upper portion. The raised upper portion may be configured to be received within the recess provided within the candle body. For example, in some embodiments the raised upper portion of the base unit and the recess in the candle body comprise complementary cross-sections thereby providing a sliding fit therebetween.

The base unit may comprise a cover over at least a portion thereof. The cover may be transparent or translucent allowing for the transmission of light therethrough. In embodiments, the cover may be provided over a raised upper portion of the base unit. Components of the base unit may be provided below the cover. For example, the cover may be provided to allow for light from the light source to be emitted from the light source within the base unit—e.g. towards the candle body, in use. The cover may be provided to allow for light from the wick (when lit) to be transmitted to the light sensor within the base unit.

The light source may be configured to emit white light. In embodiments, the light source may be configured to emit light of one or more different colours.

The light source may comprise one or more light emitting members. The one or 30 more light emitting members may comprise a bulb or an LED, for example. In some embodiments the light source may comprise a plurality of light emitting members. For example, the light source may comprise a plurality, e.g. three, LEDs. The LEDs may include a red LED, a green LED and a blue LED.

The light sensor may comprise any device operable to detect light incident thereon. The light sensor may comprise a photoconductive device, such as a photoresistor, for example. The light sensor may comprise a photojunction device, such as a photodiode or phototransistor, for example, and necessary processing circuitry, e.g. current amplifier, for signal conditioning. In some embodiments the light sensor may comprise a photovoltaic cell.

In embodiments, the light sensor may be operable to output a signal indicative of the presence or absence of light incident on the sensor. In some embodiments, the light sensor may be operable to output a signal indicative of a level of light incident on the sensor.

The signal output from the light sensor may comprise a control signal for controlling operation of the light source. For example, in some embodiments the light sensor may be operable to output a control signal for enabling or disabling operation of the light source in dependence on the presence, absence and/or level of light incident on the light sensor. In some embodiments, the light sensor may be operable to output a control signal for activating (switching on) or deactivating (switching off) the light source in dependence on the presence, absence and/or level of light incident on the light sensor.

The signal output from the light sensor may be output directly to the light source for controlling operation thereof. In alternative embodiments the signal output from the light sensor may be output to an intermediary control system (which may include one or more processors) configured to interpret the signal output from the light sensor and generate a separate control signal for controlling operation of the light source in dependence on the signal output by the light sensor.

When used herein and throughout the specification, "enabling operation of the light source" should be construed as changing the operational state of the light source to a state whereby it may be activated/illuminated upon receipt of a further input, e.g. operation of a switch by a user. Similarly, "disabling operation of the light source" should be construed as changing the operational state of the light source to a state whereby is cannot be activated, irrespective of a further input requesting activation of the light source.

In embodiments, the fibre optic may run substantially parallel to the wick through the candle body. The fibre optic may run along the length of the candle body. In presently preferred embodiments the fibre optic may run substantially centrally along the length of the candle body.

The fibre optic may be exposed at an end thereof. The exposed end may be positioned proximal to the light sensor of the base unit, in use. For example, in some embodiments the exposed end of the fibre optic may be provided at, proximal to or within the recess in the candle body. The fibre optic may comprise LDPE (low density polyethylene) and/or PMMA (polymethyl methacrylate).

In some embodiments the base unit may comprise a user-operable switch for controlling operation of the light source.

In some embodiments the base unit may comprise a proximity sensor. The proximity sensor may be configured, in use, to detect the presence of a candle body mounted to the base unit. In some embodiments the proximity sensor may comprise an infrared sensor, ultra-sonic sensor, magnetic sensor, capacitive sensor, reflect sensor, or an RGB sensor. Preferably an infrared sensor.

The proximity sensor may be operable, in use, to output a control signal for controlling operation of one or more components of the base unit in dependence on the presence (or absence) of a candle body mounted to the base unit. For example, in some embodiments the proximity sensor may be operable, in use, to output a control signal for disabling operation of the light source in dependence on the absence of a candle body mounted to the base unit. Similarly, the proximity sensor may be operable, in use, to output a control signal for enabling operation of the light source in dependence on the presence of a candle body mounted to the base unit. Advantageously, the proximity sensor may be used to prevent operation of the light source when there is no candle body mounted to the base unit—e.g. where the light sensor may be exposed to natural light within the environment which may otherwise be interpreted as a lit wick. This may prevent excessive energy consumption by the light source.

The signal output from the proximity sensor may be output directly to the light source for controlling operation thereof. In alternative embodiments the signal output from the proximity sensor may be output to an intermediary control system (which may include one or more processors) configured to interpret the signal output from the proximity sensor and generate a separate control signal for controlling operation of the light source in dependence on the signal output by the proximity sensor.

The proximity sensor may be configured, in use, to identify the candle body mounted to the base unit. In such embodiments, the base unit may be configured to control operation of the light source in dependence on the identified candle body type.

For example, the base unit may be configured to adjust the intensity of light emitted from the light source in dependence on the identified candle body type. In this way, the intensity may be increased for a larger candle body and decreased for a smaller candle body to maintain a desired light intensity level experienced by a user of the candle irrespective of the size of candle body mounted to the base unit.

In some embodiments the base unit may be configured to adjust the colour of light emitted from the light source in dependence on the identified candle body type. In this way, the colour may be chosen to complement or correspond to the colour and/or fragrance of the candle body mounted to the base unit, for example.

In some embodiments the proximity sensor may be configured to detect variations in the size of the candle body (or features thereof) which may be indicative of the type of candle body mounted to the base unit. For example, the proximity sensor may be configured to detect a depth of a recess within the candle body. The depth of the recess within the candle body may be indicative of the size or type of the candle or type of candle mounted to the base unit.

In some embodiments the proximity sensor may be configured, in use, to identify a rotational position of a candle body mounted on the base unit. In such embodiments, the base unit may be configured to control operation of the light source in dependence on the rotational position of the candle body mounted on the base unit.

For example, the base unit may be configured to adjust the intensity of light emitted from the light source in dependence on the rotational position of the candle body. In this way, the intensity may be increased and/or decreased by a user rotating the candle body on the base unit. In some embodiments the base unit may be configured to adjust the colour of light emitted from the light source in dependence on the rotational position of the candle body. In this way, the candle body may be rotated by the user to cycle through a plurality of different colours as desired.

The proximity sensor may be configured, in use, to detect variations in a surface of the candle body which may be indicative of the rotational position of the candle body on the base unit. The proximity sensor may be configured, in use, to detect variations in a surface within the recess provided within the candle body. In embodiments, the surface of the candle body may comprise a surface profile—e.g. a castellated or sloped profile. Where the surface of the candle body comprises a castellated profile, the proximity sensor may be operable, in use, to identify the rotational position of the candle body in dependence on the orientation of the surface profile. Where the surface of the candle body comprises a sloped profile, the distance between the surface and the proximity sensor may vary in dependence on the rotational position of the candle body. Accordingly, the proximity sensor may be operable to identify the rotational position of the candle body in dependence on the distance between the surface of the candle body and the proximity sensor.

The candle may comprise a control system for controlling operation of one or more components of the candle, for example for controlling operation of the light source. The control system can include one or more processors for controlling operation of the candle in accordance with one or more stored instructions. The control system may be configured to receive one or more signals from the light sensor and/or from the proximity sensor. In such embodiments, the control system may be configured to generate a control signal for controlling operation of the light source in dependence on the signal(s) received from the light sensor and/or proximity sensor.

Components of the candle may be provided on or otherwise associated with a circuit board within the base unit. The base unit may additionally comprise one or more power terminals for electrically coupling a source of power, e.g. one or more batteries for powering components of the base unit. The base unit may comprise means to couple an external source of power to the candle to the base unit for powering components thereof, e.g. to power the components directly and/or to charge a rechargeable battery provided within the base unit. For example, in such embodiments the base unit may comprise a USB port (or the like) for coupling the base unit to an external source of power.

According to an aspect of the invention there is provided a candle, comprising a base unit and a candle body removably mounted to the base unit; wherein the base unit comprises a proximity sensor configured, in use, to detect the presence of a candle body mounted to the base unit.

The candle of this aspect of the invention may include any one or more of the features of a candle of any other aspect described herein.

In some embodiments the base unit may comprise a light source. The light source may be operable to illuminate the candle body. The light source may be configured to emit white light or light of one or more different colours. The light source may comprise one or more light emitting members. The one or more light emitting members may comprise a bulb or an LED, for example.

In embodiments, the base unit may comprise a light sensor. The light sensor may be configured in use to detect light emitted from a wick of the candle body, when lit. In such embodiments, the candle may be configured such that operation of the light source is dependent on both detection of light by the light sensor and detection of the presence of a candle body mounted on the base unit by the proximity sensor.

According to an aspect of the invention there is provided a candle body for use as part of a candle in accordance with any preceding claim, the candle body comprising: a wick and a fibre optic running therethrough; and wherein the candle body is configured for removably mounting the candle body to the base unit.

The candle body of this aspect of the invention may include any one or more of the features of a candle body described with reference to any other aspect described herein.

According to a further aspect of the invention there is provided a candle body for use as part of a candle in accordance with any preceding aspect of the invention, the candle body comprising: a wick and a fibre optic running therethrough; and wherein the candle body comprises a recess therein configured to receive at least a portion of a base unit for removably mounting the candle body to the base unit.

The candle body of this aspect of the invention may include any one or more of the features of a candle body described with reference to any other aspect described herein.

DETAILED DESCRIPTION OF THE INVENTION

In order that the invention may be more clearly understood one or more embodiments thereof will now be described, by way of example only, with reference to the accompanying drawings, of which:

Figure 1:
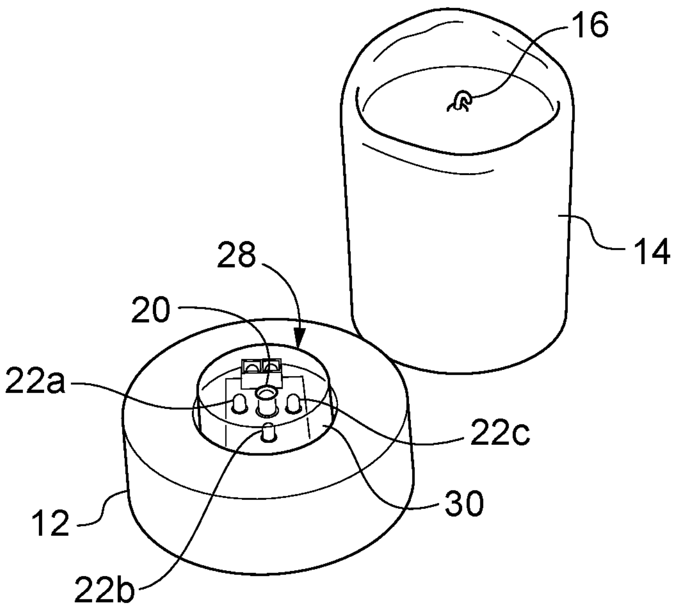
FIG. 1 is a perspective view of an embodiment of a candle in accordance with the present invention.
Figure 2:
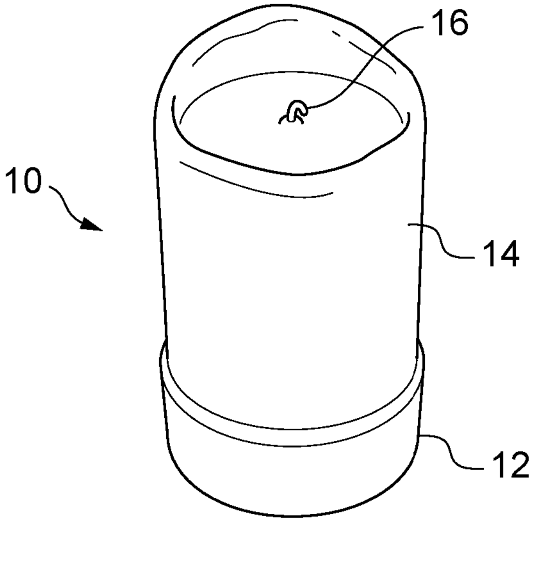
FIG. 2 is a further perspective view of the candle shown in FIG. 1.
Figure 3:
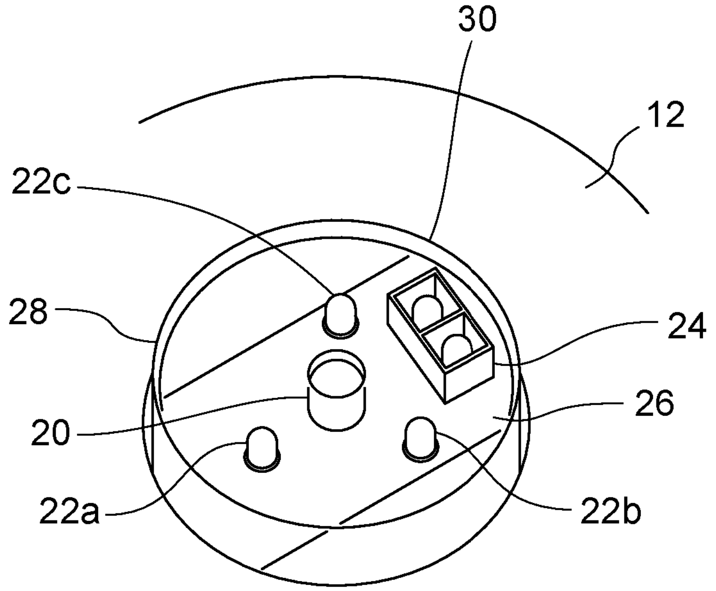
FIG. 3 is a perspective view of a base unit forming part of the candle shown in the preceding Figures.
Figure 4:
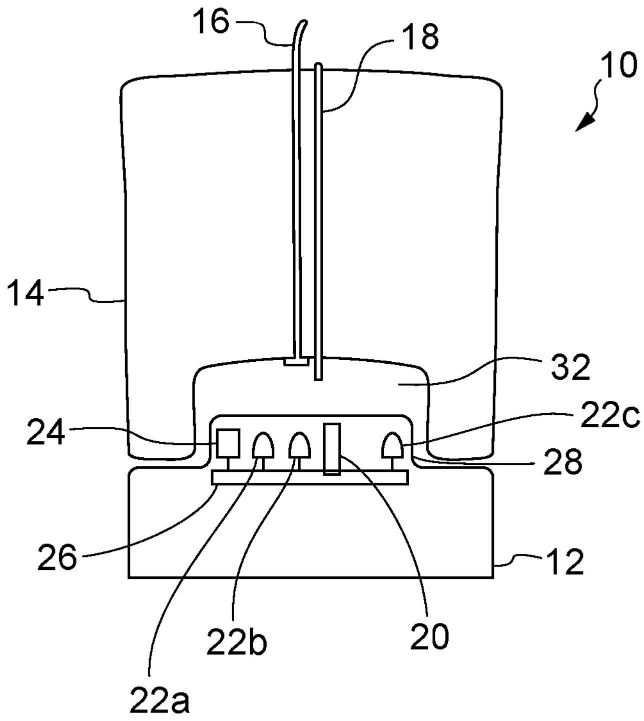
FIG. 4 is a side cross-sectional view of the candle shown in the preceding Figures.
Figure 5B:
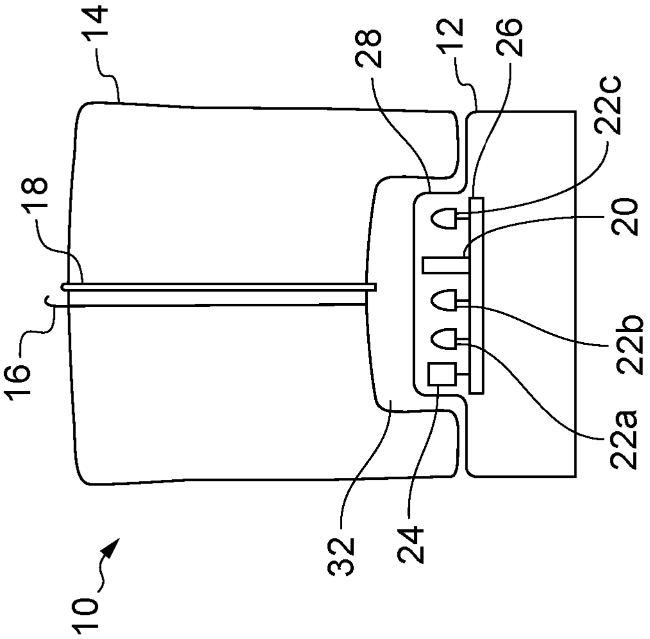
FIGS. 5A & 5B are side cross-sectional views of the candle shown in the preceding Figures illustrating the operational use thereof.
Figure 5A:
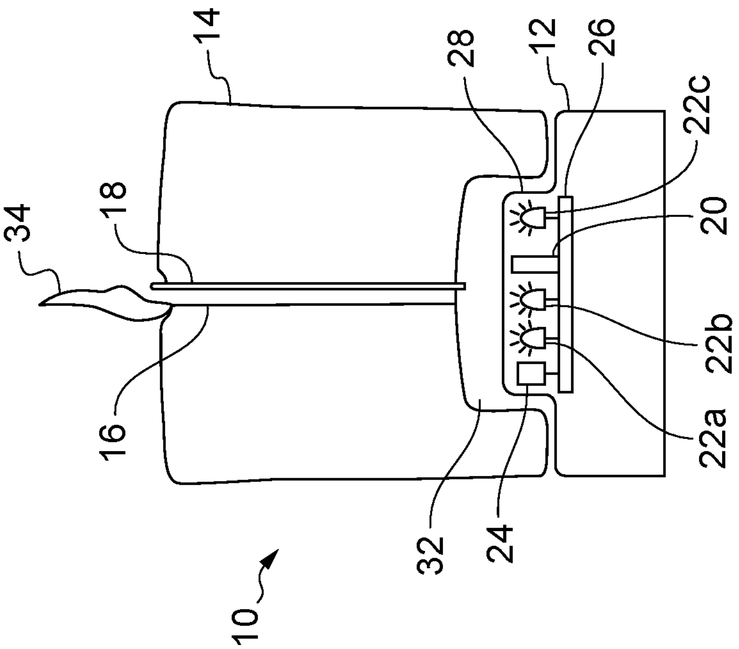

The present invention relates generally to a candle 10, 110 comprising a base unit 12, 112 and a candle body 14, 114 removably mounted to the base unit 12, 112. The candle body 14, 114 includes a wick 16, 116 and in embodiments a fibre optic 16, 116 running through the candle body 14, 114. A light sensor 20, 120 is provided and configured, in use, to detect light from the wick 16, 116—i.e. from a flame when the wick 16, 116 is lit. Upon detection of light from the wick 16, 116, a light source 22, 122 may be activated to illuminate the candle body 14, 114. In this way, the present invention provides a candle 10, 110 which may automatically illuminate when lit.

FIGS. 1-5B illustrate a first embodiment of a candle 10 in accordance with the present invention.

The candle 10 includes a base unit 12 and a candle body 14 removably mounted to the base unit 12. The candle body 14 is provided with a wick 16 and a fibre optic 18 running therethrough. The base unit 12 includes a light sensor 20 for detecting light associated with a flame 34 present when the candle 10 is lit. Specifically, light from the flame 34 is transmitted along the fibre optic 18 and is incident on the light sensor 20. Upon detection of light by the light sensor 20, a light source in the form of LEDs 12*a*, 12*b*, 12*c* may be activated to illuminate the candle body 14.

The candle body 14 is formed mainly of a combustible material, typically paraffin wax and, in the illustrated embodiment, is cylindrical having the wick 16 and fibre optic 18 running parallel substantially central along its length. A recess 32 is provided within the candle body 14, here at a lower end of the candle body 14 in the illustrated orientation. The recess 32 is shaped so as to correspond with a raised upper portion 28 on the base unit 12. In this way, the recess 32 and raised upper portion 28 provide means to removably mount the candle body 14 to the base unit 12, in use.

The raised upper portion 28 of the base unit 12 includes a clear (i.e. transparent) cover and houses components of the base unit 12, including the light sensor 20 and LEDs 22*a*, 22*b*, 22*c*. The cover allows for light to be transmitted therethrough—e.g. from the LEDs 22*a*, 22*b*, 22*c* to the candle body 14, and from the fibre optic 18 to the light sensor 20. The base unit additionally includes a proximity sensor in the form of infrared sensor 24. As is discussed in detail herein, the infrared sensor 24 is configured at least to identify whether the candle body 14 is mounted to the base unit 12.

Components of the base unit 12, i.e. the light sensor 20, LEDs 22*a*, 22*b*, 22*c* and the infrared sensor are operatively coupled to a circuit board 26 which may include one or more processors (not shown) for controlling operation of these components. The circuit board 26 may also include an interface for coupling a source of power to the circuit board 26 for powering components associated therewith. The source of power can include a battery or batteries provided within the base unit 12, or an interface for coupling the circuit board 26 to an external source of power.

As discussed herein, the base unit 12 includes a proximity sensor in the form of infrared sensor 24. The infrared sensor 24 is configured, in use, to detect the presence of the candle body 14 mounted to the base unit 12.

Specifically, the infrared sensor 24 is operable, in use, to output a control signal for controlling operation of one or more components of the base unit 12 in dependence on the presence (or absence) of the candle body 14 mounted to the base unit 12. As discussed herein, the control signal may be output directly to the one or more components of the base unit, or indirectly via a central control system—e.g. one or more processors—operable to interpret the output from the infrared sensor and instruct operation of the one or more components of the base unit 12 accordingly.

The control signal may be for disabling operation of one or more of the LEDs 22*a*, 22*b*, 22*c* in dependence on the absence of the candle body 14 mounted to the base unit 12. Similarly, the control signal may be for enabling operation of one or more of the LEDs 22*a*, 22*b*, 22*c* in dependence on the presence of the candle body 14 mounted to the base unit 12. In this way, the infrared sensor 24 may be used to prevent operation of one or more of the LEDs 22*a*, 22*b*, 22*c* when there is no candle body mounted to the base unit 12—e.g. where the light sensor 20 may be exposed to natural light within the environment which may otherwise be interpreted as a lit wick. This may prevent excessive energy consumption by the LEDs 22*a*, 22*b*, 22*c*.

The infrared sensor 24 is additionally configured, in use, to identify the candle body 14 mounted to the base unit 12, and to control operation of one or more of the LEDs 22*a*, 22*b*, 22*c* in dependence on the identified candle body type. Controlling operation of the LEDs 22*a*, 22*b*, 22*c* may include adjusting the intensity or colour of light emitted into the candle body 14.

Figure 6B:
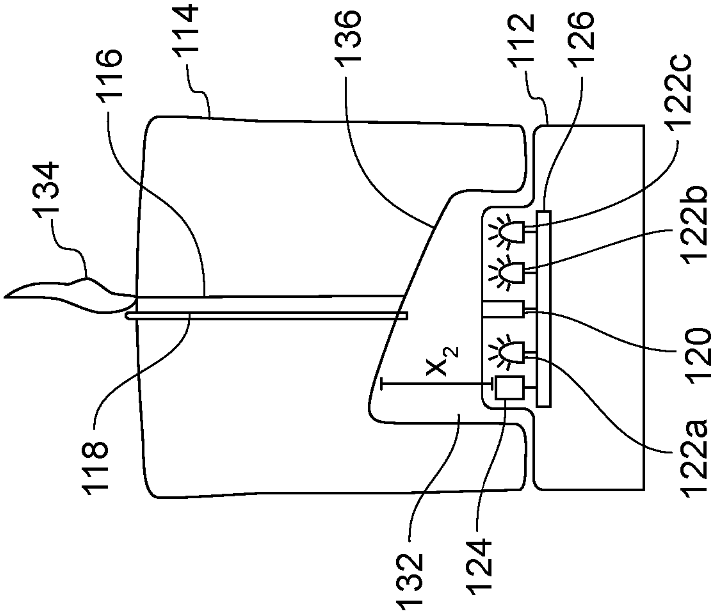
FIGS. 6A & 6B are side cross-sectional views of a further embodiment of a candle according to the invention illustrating the operational use thereof.
Figure 6A:
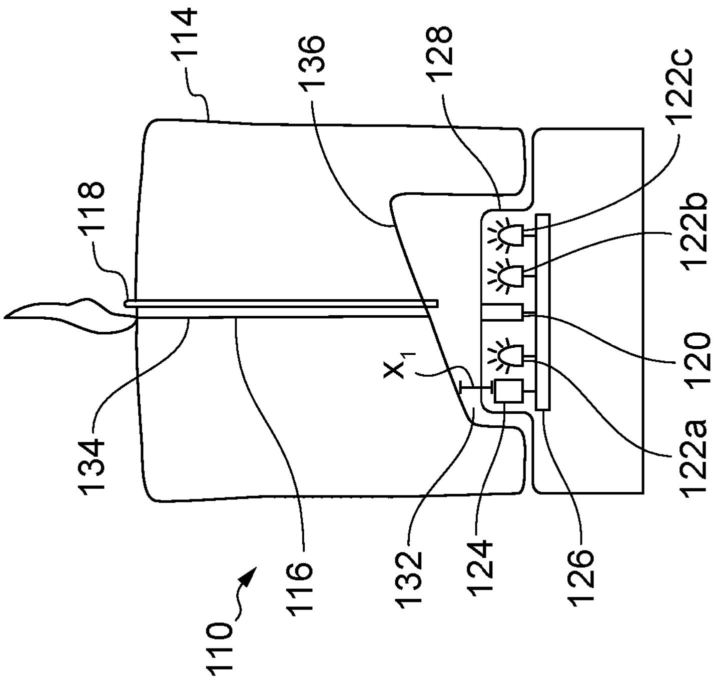

FIGS. 6A and 6B illustrate a second embodiment of a candle 110 in accordance with the invention. The candle 110 is substantially the same as candle 10. Accordingly, like reference numerals have been used to represent like components.

In this embodiment, a proximity sensor in the form of infrared sensor 124 is provided which is configured to detect variations in the size of the candle body 114 (or features thereof) which are indicative of the type of candle body 114 mounted to the base unit 112. Specifically, the infrared sensor 124 is configured to detect a depth of a recess 132 within the candle body 114. Here, the depth of the recess 132 within the candle body 114 is indicative of the rotational position of the candle body 114 on the base unit 112 as described below.

As with base unit 12, the base unit 112 includes a light source in the form of LEDs 122*a*, 122*b*, 122*c*. Here, the base unit 112 is configured to control operation of the LEDs 122*a*, 122*b*, 122*c* in dependence on the rotational position of the candle body 114 on the base unit 112 as determined using the infrared sensor 124. Specifically, the base unit 112 is configured to adjust the intensity of light emitted from the LEDs 122*a*, 122*b*, 122*c* in dependence on the rotational position of the candle body 114. In this way, the intensity may be increased and/or decreased by a user simply by rotating the candle body 114 on the base unit 112.

The recess 132 within the candle body 114 includes a surface 136 having a sloped profile. Upon rotation of the candle body 114 with respect to the base unit 112, the portion of the surface 136 positioned directly above the infrared sensor 124 will change. By sloping the surface 136, the distance between the surface 136 and the infrared sensor 124 will change depending on the rotational position of the candle body 114. Accordingly, by measuring this distance the rotational position of the candle body 114 can be determined.

In FIG. 6A, the candle body 114 is in a first rotational position with respect to the base unit 112, with the distance $X_1$ between the infrared sensor 124 and the surface 136 of the recess 132. In FIG. 6B, the candle body 114 is in a second rotational position with respect to the base unit 112, with the distance $X_2$ between the infrared sensor 124 and the surface 136 of the recess 132. In the illustrated embodiment $X_1$ is less than $X_2$, however, it will be appreciated that the candle 110 may be configured in the opposite sense with $X_2$ being greater than $X_1$.

Infrared sensor 124 is operable to output a signal indicative of the measured distance $X_1/X_2$, and the intensity of light emitting from LEDs 122*a*, 122*b*, 122*c* may be controlled accordingly. As shown, with the candle body 114 in a first rotational position (as shown in FIG. 6A), the LEDs 122*a*, 122*b*, 122*c* are controlled to emit light at a first, high intensity. When the candle body 114 is in a second rotational position (as shown in FIG. 6B), the LEDs 122*a*, 122*b*, 122*c* are controlled to emit light at a second, lower intensity.

The LEDs 122*a*, 122*b*, 122*c* may be operable at discrete intensity levels—e.g. the first and second intensity levels shown in FIGS. 6A and 6B, or indeed any number of discrete levels which may be provided between a minimum (e.g. LEDs off) and a maximum intensity for the LEDs 122*a*, 122*b*, 122*c*. In alternative arrangements, the intensity of the LEDs 122*a*, 122*b*, 122*c* may be varied continuously in dependence on rotational position of the candle body 114.

The one or more embodiments are described above by way of example only. Many variations are possible without departing from the scope of protection afforded by the appended claims.

The invention is defined by the claims.

The invention claimed is:

1. A candle, comprising:

a base unit and a candle body removably mounted to the base unit;

wherein the candle body comprises a wick and a fibre optic running therethrough; and, the base unit comprises: a light sensor configured, in use, to detect light emitted from the wick and transmitted via the fibre optic; and, a light source configured to operate in dependence on detection of light by the light sensor: sensor; and, a proximity sensor configured, in use, to detect the presence of a candle body mounted to the base unit, wherein the proximity sensor is operable, in use, to: output a control signal for disabling operation of the light source in dependence on the absence of a candle body mounted to the base unit and/or output a control signal for enabling operation of the light source in dependence on the presence of a candle body mounted to the base unit.

2. The candle of claim 1, wherein the candle body comprises a recess in a portion thereof.

3. The candle of claim 2, wherein the recess is provided in a lower portion of the candle body and is configured to receive at least a portion of the base unit for removably mounting the candle body to the base unit, in use.

4. The candle of claim 2, wherein the base unit comprises a raised upper portion configured to be received within the recess provided within the candle body.

5. The candle of claim 1, wherein the light source comprises one or more light emitting members.

6. The candle of claim 1, wherein the light sensor is operable to output a signal indicative of: the presence or absence of light incident on and/or a level of light incident on the sensor.

7. The candle of claim 6, wherein the light sensor is operable to output a control signal for enabling or disabling operation of the light source in dependence on the presence, absence and/or level of light incident on the light sensor.

8. The candle of claim 1, wherein the fibre optic runs substantially parallel to the wick along the length of the candle body and/or the fibre optic is exposed at an end thereof, the exposed end being positioned proximal to the light sensor of the base unit, in use.

9. The candle of claim 1, wherein the proximity sensor is configured, in use, to identify the candle body mounted to the base unit; and to control operation of the light source in dependence on the identified candle body type.

10. The candle of claim 9, wherein the base unit is configured to adjust the intensity and/or colour of light emitted from the light source in dependence on the identified candle body type.

11. The candle of claim 1, wherein the candle body comprises a recess in a portion thereof, and, further wherein the proximity sensor is configured to detect a depth of the recess within the candle body, the depth of the recess within the candle body being indicative of the size or type of the candle or type of candle mounted to the base unit.

12. The candle of claim 1, wherein the proximity sensor is configured, in use, to identify a rotational position of the candle body mounted on the base unit, and to control operation of the light source in dependence on the rotational position of the candle body mounted on the base unit and/or wherein the base unit is configured to adjust the intensity of light emitted from the light source and/or adjust the colour of light emitted from the light source in dependence on the rotational position of the candle body.

13. The candle of claim 1, wherein the proximity sensor is configured, in use, to detect variations in a surface of the candle body indicative of the rotational position of the candle body on the base unit.

14. The candle of claim 1. wherein the candle body comprises a recess in a portion thereof, and further wherein the proximity sensor is configured, in use, to detect variations in a surface within the recess provided within the candle body.

15. The candle of claim 6, wherein the light sensor is operable to output a control signal for activating or deactivating the light source in dependence on the presence, absence and/or level of light incident on the light sensor.

* * * * *